United States Patent Office 2,941,373
Patented June 21, 1960

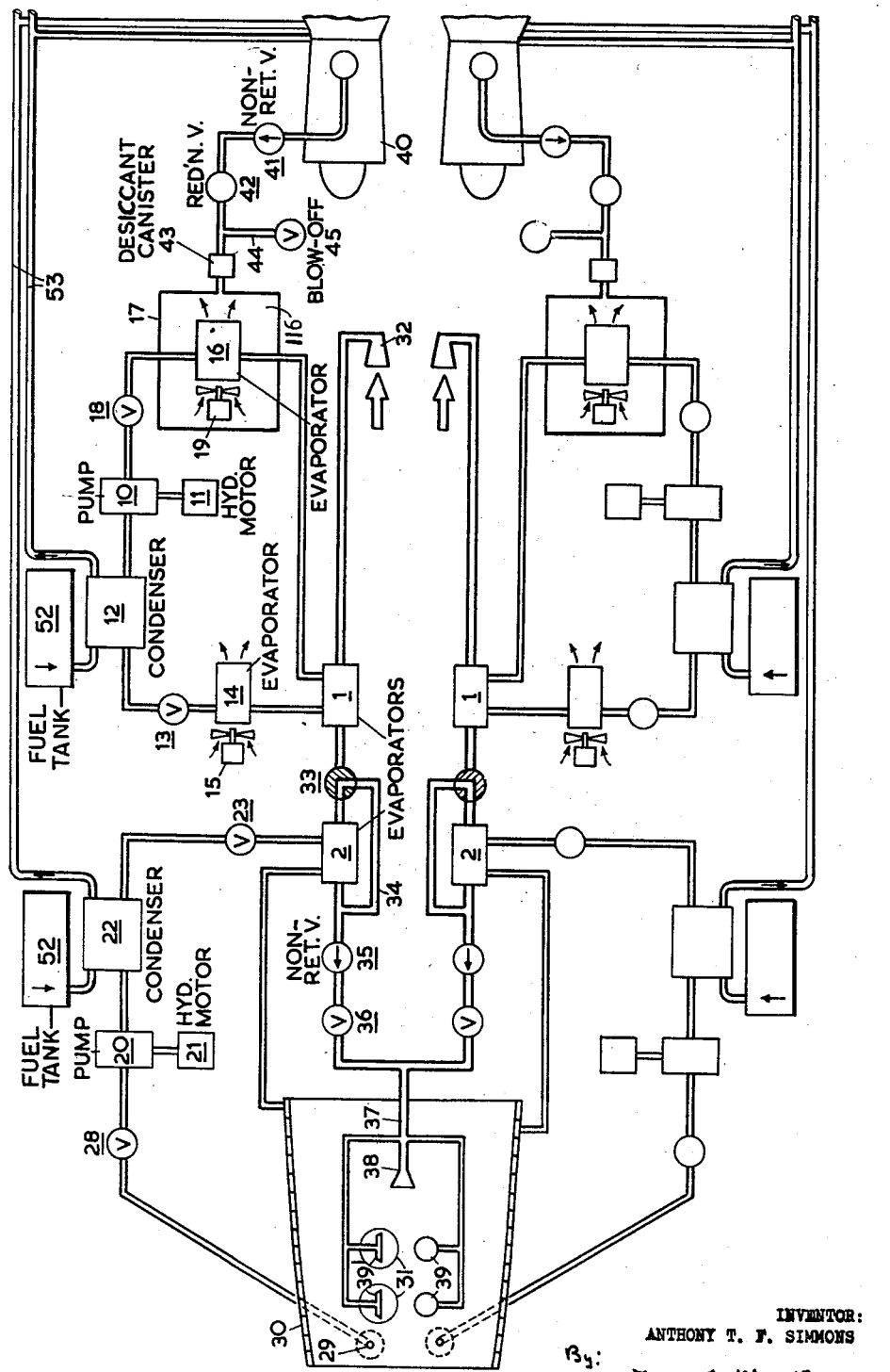

2,941,373

TEMPERATURE CONTROL AND PRESSURISATION SYSTEMS FOR AIRCRAFT COCKPITS

Anthony Thomas Frederic Simmons, Preston, England, assignor to The English Electric Company Limited, London, England, a company of Great Britain Filed Nov. 26, 1956, Ser. No. 624,401

Claims priority, application Great Britain Dec. 9, 1955

3 Claims. (Cl. 62—7)

This invention relates to temperature control and pressurisation system for the cockpits of aircraft designed to fly at extreme speeds and/or altitudes at which the temperature of the aircraft skin may rise and the pressure of the ambient atmosphere drop to conditions in which human life cannot be sustained.

According to the present invention ram air is scooped up and is brought firstly into heat exchange with a high temperature circuit of a coolant, then in heat exchange with a low temperature circuit of a coolant, and eventually is introduced into the cockpit for making up losses owing to leakage and for supplying fresh air to the cockpit. Preferably this supply is divided into a general supply to the cockpit, supplies to the members of the crew individually, and window sprays keeping those parts of the cockpit cooled which do not allow for a double wall construction with a metal inner skin.

The coolant of the high temperature circuit may be used for cooling a forward equipment bay and an aft equipment container of the aircraft, where equipment is accommodated which requires cooling for functioning properly.

The coolant of the said low temperature circuit is circulated through a double-walled cabin shield, thereby preventing the ingress of heat into the cockpit.

As a re-cooling medium for the coolant of both the high tempertaure and low temperature circuits the liquid fuel may be used as it is supplied to the propulsive plant of the aircraft and which is thereby preheated.

In order that the invention may be clearly understood and readily carried into effect, an embodiment thereof will now be described by way of example with reference to the accompanying drawing which is a circuit diagram of the air and coolant circuits.

It will be seen that all circuits are duplicated for safety, a single circuit system being sufficient for temperature control and pressurisation for a limited period in case of emergency. On the other hand both systems are normally not run at full capacity, leaving a wide margin for increase of output in case of emergency.

Because of the complete symmetry of the duplicated circuits it will suffice to describe one of the systems.

In the high temperature circuit, a pump 10 driven for example by a hydraulic motor 11 compresses Freon vapour and supplies the same to a condenser where it is in heat exchange with the comparatively cool liquid fuel supply to the aircraft propulsion system and is thereby condensed. The liquid Freon is relieved of pressure and accordingly partly evaporated when passing through a temperature control throttle valve 13 and the cold Freon mixed vapour and liquid phases pass in succession to an evaporator 14, which may be installed in a forward equipment bay of the aircraft, although its use is not limited to this special purpose. Circulation of air cooled in heat exchange with this evaporator may be assisted by a motor driven fan 15.

From the aforesaid evaporator the cold Freon passes through a primary evaporator 1 in heat exchange with the air supply, which will be described in more detail later.

From there the still cold Freon passes through another evaporator 16 in a container 116, which may serve as an aft equipment container although its use is not limited to this special purpose. From this evaporator 16 the now fully vaporised Freon is returned through a constant back pressure valve 18 to the inlet of the aforesaid pump 10.

In the low temperature circuit, Freon vapour is compressed by a pump 20 driven for example by a hydraulic motor 21, and passed through a condenser 22 in heat exchange with comparatively cool liquid fuel supplied from the fuel tanks 52 to the propulsive plant 40 of the aircraft through a fuel system 53 (or to any other propulsion plant thereof not shown), whereby the Freon vapour is condensed. The resultant liquid is then relieved of pressure and thereby partly evaporated by a temperature control throttle valve 23, and then passed through a secondary evaporator 2 cooling the air supply as will be described in more detail later.

From the said evaporator 2 the Freon flows through a light alloy cabin shield 30 surrounding the cockpit wherever transparence for visibility is not required.

This cabin shield forms a non-structural inner skin and is secured to the inside flanges of the structural frames within the cabin. It is constructed by welding together two sheets of metal, face to face. In each sheet long channels are formed in such a way that the final shield is traversed by two long separate passages through each of which Freon passes out of and into one of the said two duplicated low temperature circuits. The Freon is then returned from the cabin shield 30 and drains 29 through a constant back pressure valve 28 to the aforesaid pump 20.

Compressed air derived from a high pressure compressor stage of a turbo-jet engine 40 used for the propulsion of the aircraft may be passed through a non-return valve 41 and a reduction valve 42 adjusted to a constant pressure of for example 20 pounds per square inch absolute and a desiccant canister 43 to the aforesaid aft equipment container 17. A branch line 44 containing a blow-off or safety valve 45 is branched off between the said reduction valve 42 and desiccant canister 43.

The circulation of air through the aforesaid evaporator 16 arranged in said aft equipment container 17 may be assisted also by a motor-driven fan 19 arranged inside the said container 17, if necessary.

The two evaporators 14, 16, or either of them, for the forward equipment bay or aft equipment container may be dispensed with, if no cooling equipment is required.

Ram air indicated by the thick arrow is scooped up by a ram inlet 32 on the aircraft, and passed through the said primary evaporator 1 in heat exchange with the Freon vapour of the high temperature circuit, and from there through a two-way valve 33 through the said secondary evaporator 2 and/or a by-pass line 34 parallel thereto. In this second evaporator 2 the air is in heat exchange with the Freon vapour of the low temperature coolant circuit.

The cooled air then passes through a non-return valve 35 and a control valve 36 which is normally not fully open but allows for doubling the flow through it in emergency, into a manifold 37 distributing it between a general air supply 38 to the cabin, personal supplies 39 to the members of the crew, for example pilot and observer, and window sprays 39' cooling those parts of the cockpit such as windows 31 which cannot be built double-walled with a metal inner skin, and which cannot therefore be passed by the coolant.

What I claim as my invention and desire to secure by Letters Patent is:

1. A temperature control and pressurisation system for an aircraft having a propulsive plant and a liquid fuel supply system therefor including a fuel storage tank, comprising in combination: a cockpit, a ram air scoop, a primary evaporator having a hot pass and a cold pass, a secondary evaporator having a hot pass and a cold pass and an air supply manifold, the said ram air scoop, hot pass of the primary evaporator, hot pass of the secondary evaporator and cockpit being in series communication with one another, two closed coolant circuits, one for the said primary evaporator and the other for the said secondary evaporator, each of the said closed circuits containing in series a circulating pump having a driving motor, a condenser having a separate pass for a re-cooling medium, a throttle valve, the cold pass of its respective evaporator and a constant back pressure valve, the latter being connected to the inlet of its respective pump, the said two separate passes for the re-cooling medium being connected into the said liquid fuel supply system between the said fuel storage tank and the said propulsive plant.

2. A temperature control and pressurisation system as claimed in claim 1, wherein the said closed coolant circuit of the said secondary evaporator comprises a double walled cabin shield surrounding the said cockpit.

3. A temperature control and pressurisation system as claimed in claim 1, comprising a general cooled air supply orifice to the said cockpit, individual supply orifices to the members of the crew and a window spray directed from inside the said cockpit to parts of the cockpit inherently of single-wall construction, the said general air supply orifice, individual supply orifices and window spray all being branched off the said manifold.

References Cited in the file of this patent

UNITED STATES PATENTS

| | | |
|---|---|---|
| 2,145,678 | Backstrom | Jan. 31, 1939 |
| 2,155,516 | Tull et al. | Apr. 25, 1939 |
| 2,390,255 | Hess | Dec. 4, 1945 |
| 2,398,655 | Mayer | Apr. 16, 1946 |
| 2,473,496 | Mayer | June 14, 1949 |
| 2,477,932 | King | Aug. 2, 1949 |
| 2,575,541 | Williamson et al. | Nov. 20, 1951 |
| 2,796,743 | McFarlan | June 25, 1957 |

FOREIGN PATENTS

| | | |
|---|---|---|
| 44,480 | France | Nov. 8, 1934 |
| | (Addition to No. 757,057) | |
| 544,227 | Great Britain | Apr. 2, 1942 |